United States Patent

[11] 3,592,076

| [72] | Inventor | Martin R. Baginski<br>Ashtabula, Ohio |
|---|---|---|
| [21] | Appl. No. | 829,993 |
| [22] | Filed | June 3, 1969 |
| [45] | Patented | July 13, 1971 |
| [73] | Assignee | Ashtabula Bow Socket Company<br>Ashtabula, Ohio |

[54] PLASTIC BICYCLE PEDAL WITH A FOOT STRAP MEANS
13 Claims, 12 Drawing Figs.

| [52] | U.S. Cl. | 74/594.5, 74/594.6 |
|---|---|---|
| [51] | Int. Cl. | G05g 1/14 |
| [50] | Field of Search | 74/594.6, 594.5, 594.4 |

[56] References Cited
UNITED STATES PATENTS

| 1,393,256 | 10/1921 | Wright | 74/594.5 X |
| 1,425,215 | 8/1922 | Persons | 74/594.4 |
| 3,313,177 | 4/1967 | Mueller | 74/594.6 |
| 3,382,734 | 5/1968 | Hussey | 74/594.4 |
| 3,485,113 | 12/1969 | Adcock | 74/594.4 |

FOREIGN PATENTS

| 1,036,229 | 4/1953 | France | 74/594.4 |

*Primary Examiner*—Milton Kaufman
*Attorney*—Yount and Tarolli

ABSTRACT: A bicycle pedal comprises a pedal axle and a pedal body. The pedal body includes a pedal body member, protective strap means for the body member, bearing means, and foot strap means. The pedal body has an upper side adapted to engage the cyclist's foot and outer sides adjacent to the upper side. The protective strap means defines at least a portion of the outer sides for protecting the pedal body member which is formed from a plasticlike material. The pedal body member receives the bearing means which in turn receives the pedal axle such that relative rotation between the pedal axle and the pedal body may be effected. The foot strap means is attached to the pedal body member by said protective strap means.

PATENTED JUL 13 1971 3,592,076
SHEET 1 OF 2
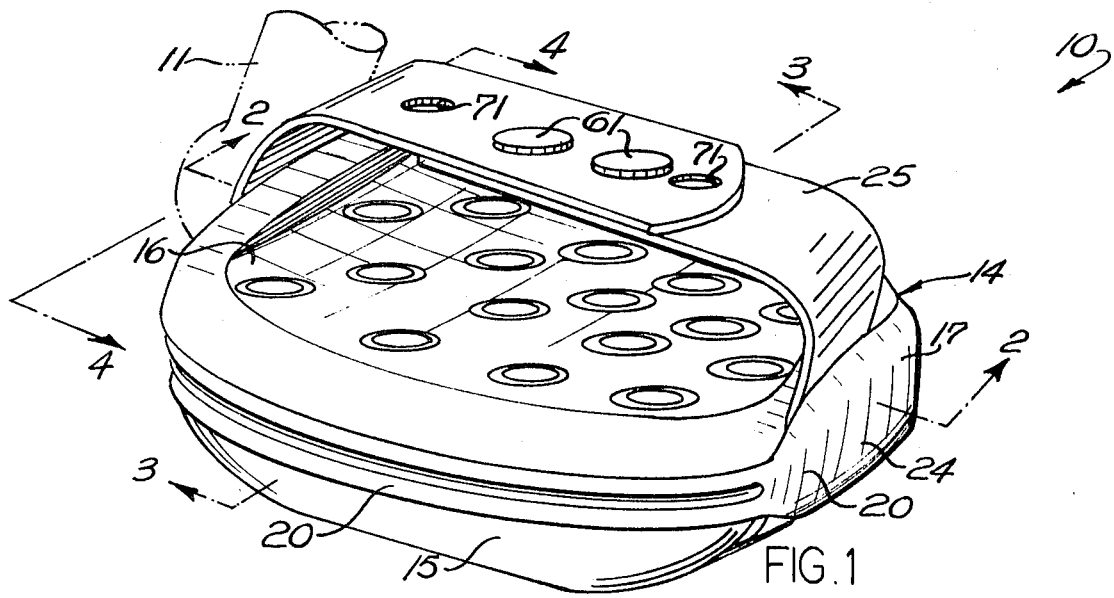
FIG.1
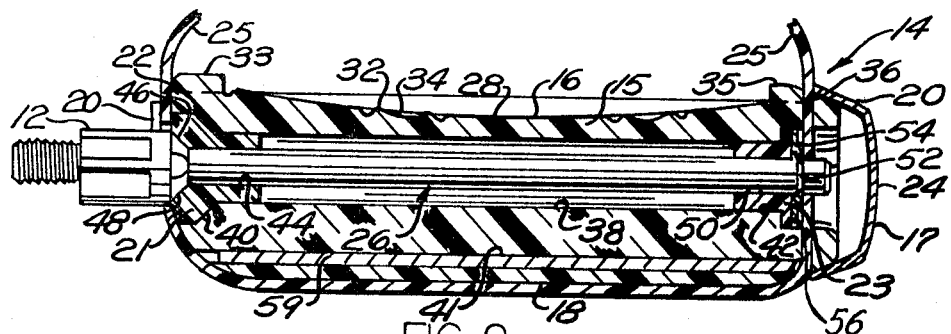
FIG.2
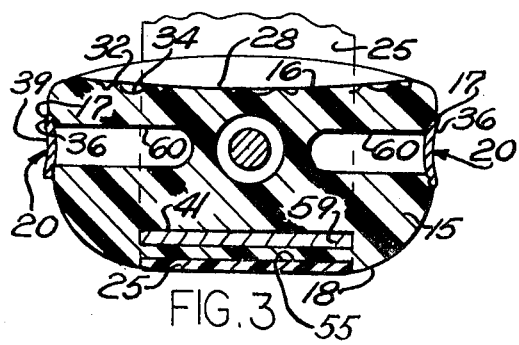
FIG.3
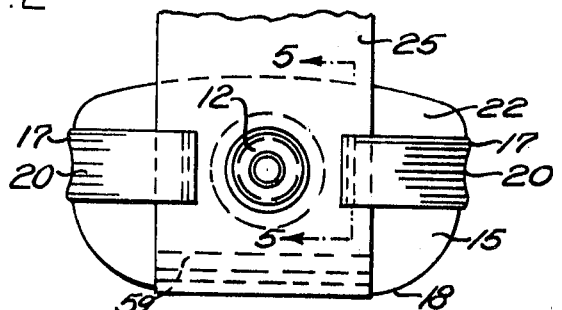
FIG.4
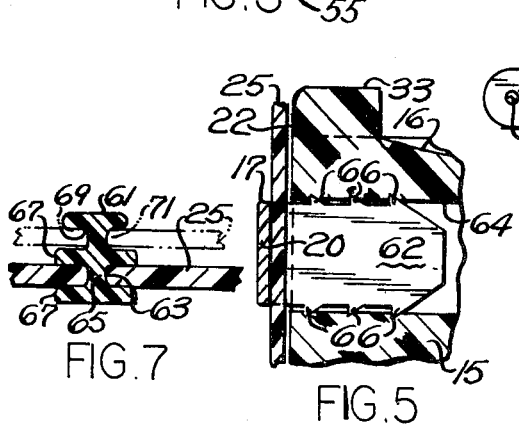
FIG.5
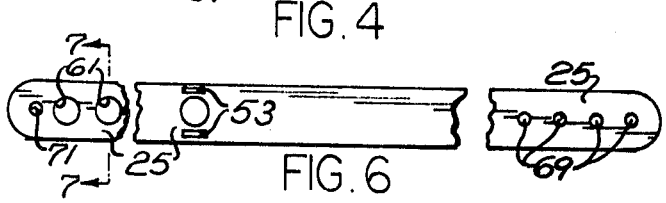
FIG.6
FIG.7
INVENTOR
MARTIN R. BAGINSKI
BY Yount and Tarolli
ATTORNEYS

PATENTED JUL13 1971 3,592,076

INVENTOR
MARTIN R. BAGINSKI
BY Yount and Tarolli
ATTORNEYS

PLASTIC BICYCLE PEDAL WITH A FOOT STRAP MEANS

The present invention relates to a bicycle pedal having a pedal axle and a pedal body and particularly to a pedal for an exerciser cycle The design of an exerciser pedal which includes a foot strap and a plastic pedal body member has been complicated by certain design considerations which are important from both a commercial and operational standpoint, These design considerations include designing the pedal such that the foot strap means and the surface which engages the rider's foot will retain the rider's foot in a centered position thereon and prohibit it from slipping on the pedal. Conventionally, such a pedal is mounted on an exerciser or stationary bicycle and is used for exercising purposes in order to maximize the amount of exercise that would be realized from such a device The foot strap means allows the rider to exert an upward force and the upper surface of the pedal body allows the rider to exert a downward force. Thus, the rider is able to exert a force with his foot throughout each rotational cycle of the bicycle pedal.

To build a quality plastic pedal which is competitive with the quality pedals currently being marketed, it is essential that the plastic pedal body member of such a pedal be protected from abrasion. For example, when a bicycle pedal is mounted on an exercise cycle, the end thereof may be subjected to impact forces and abrasion. When such impact and abrasion is repeatedly exerted on such a plastic pedal, it will render the pedal unsightly and perhaps inoperative. Yet another consideration essential to the design of such pedals is that the pedal body must be able to rotate about the pedal axle without binding. Such spin characteristics are essential to the marketability of pedals. Moreover, quality pedal design requires a construction having relatively high-strength and impact resistance characteristics.

Further advantages inherent in the design of a bicycle pedal having a plastic pedal body member include the effective use of intricate die work for use in the design of such a plastic pedal body member and also the color of the plastic compounds available to manufacture such a part.

Accordingly, the principal object of the present invention is to provide a new and improved bicycle pedal which includes a pedal axle and a pedal body supported for relative rotation wherein the pedal body includes foot strap means for retaining the rider's foot on the bicycle pedal and in which at least a portion of the pedal body is formed from a plasticlike material and which is designed such that abrasion to the pedal body is minimized.

A further object of the present invention is to provide a new and improved bicycle pedal which includes a pedal axle and a pedal body supported for relative rotation which is designed to maintain a rider's foot centered on the bicycle pedal body wherein the pedal body includes foot strap means for retaining the rider's foot on the bicycle pedal and in which at least a portion of the pedal body is formed from a plasticlike material.

It is another object of the present invention to provide a new and improved bicycle pedal which includes a pedal axle and a pedal body supported for relative rotation wherein said pedal body includes a member for weighting the pedal body such that the pedal body will remain in one position when at rest.

It is a further object of the present invention to provide a new and improved bicycle pedal which includes a pedal axle and pedal body supported for relative rotation wherein the pedal body includes a foot strap means for retaining the rider's foot on the bicycle pedal and which is adjustable in length for adjusting the foot strap means to accommodate any specific rider's foot.

It is yet another object of the present invention to provide a new and improved bicycle pedal which includes a pedal axle and a pedal body supported for relative rotation wherein the pedal body includes foot strap means for retaining the rider's foot on the bicycle pedal and in which at least a portion of the pedal boy is formed from a plasticlike material and in which the pedal body is designed to maximize the spin characteristics of such a pedal while remaining relatively silent in operation.

A still further object of the present invention is to provide a new and improved bicycle pedal which includes a pedal axle and a pedal body supported for relative rotation wherein the pedal body includes foot strap means for retaining the rider's foot on the bicycle pedal and in which at least a portion of the pedal body is formed from a plasticlike material and in which the pedal body is designed such that the strength and impact resistance characteristics of such a bicycle pedal are increased.

A further object of the present invention is to provide a new and improved bicycle pedal which includes a pedal axle and a pedal body supported for relative rotation, wherein the pedal body includes foot strap means, a pedal body member formed from plasticlike material and a protective strap means attached to the pedal body member such that the foot strap means is secured thereto.

Yet another object of the present invention is to provide a new and improved bicycle pedal which includes a pedal axle and a pedal body supported for relative rotation wherein the pedal body includes a foot strap means, a pedal body member formed from a plasticlike material and a protective strap means attached to the pedal body member for protecting the pedal body member from abrasion and increasing the strength and impact resistance characteristics of such a bicycle pedal.

Further objects and advantages of the present invention will be apparent to those skilled in the art to which it relates from the following detailed description of preferred embodiments thereof made with reference to the accompanying drawings in which:

FIG. 1 is a perspective view of a bicycle pedal embodying the present invention;

FIG. 2 is a cross-sectional view of the bicycle pedal shown in FIG. 1 taken along line 2–2 thereof;

FIG. 3 is a cross-sectional view of the bicycle pedal of the immediate invention shown in FIG. 1 taken along line 3–3 thereof;

FIG. 4 is a rear view of the bicycle pedal shown in FIG. 1 taken along line 4–4 thereof;

FIG. 5 is a fragmentary sectional view of the bicycle pedal shown in FIG. 4 taken along line 5–5 thereof;

FIG. 6 is a plan view of a foot strap and retaining means prior to assembly;

FIG. 7 is a cross-sectional view along line 7–7 of FIG. 6 showing the attachment of the retaining means to the foot strap means;

Figure 9:
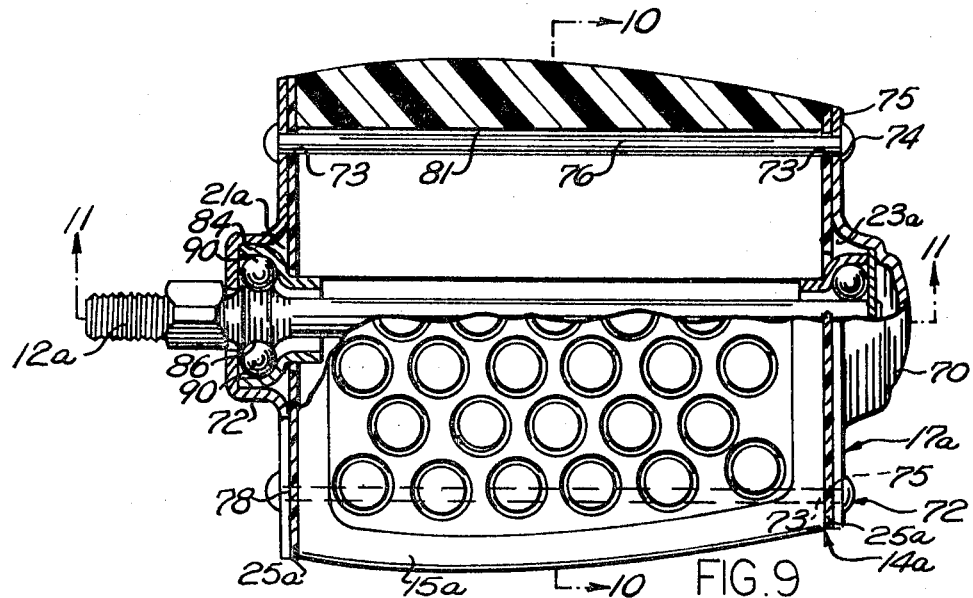
FIG. 9 is a plan view of the bicycle pedal shown in FIG. 8 having a portion thereof shown in section for ease of description.

The present invention provides an improved bicycle pedal having a pedal axle and a pedal body in which the pedal body includes a foot strap and a pedal body member which is formed from a plasticlike material. The improved bicycle pedal of the immediate invention is designed such that the foot will remain in a centered position thereon and will not slip therefrom, to minimize abrasion of the pedal body, to provide excellent spin characteristics, and yet is simple in construction and assembly, and has increased strength and impact resistance characteristics. The present invention may be applied to pedals of a wide variety of constructions and designs and for purposes of illustration, is described and illustrated in the drawings as applied to a bicycle pedal 10 shown in FIG. 1.

The bicycle pedal 10 is mounted on a bicycle crank 11 and includes a pedal axle 12 shown in FIG. 2 and a pedal body generally indicated at 14. The pedal body 14 has an upperside 16 adapted to engage a rider's foot a lower side 18 and outer sides 20 adjacent to the upper and lower sides 16, 18, respectively. A portion of the outer sides 20 of the pedal body 14 defines an inboard end 22 and and outboard end 24 of the pedal body 14. The pedal body 14 has an aperture generally indicated at 26, extending from the inboard end 22 to the outboard end 24, as shown in FIG. 2 rotatably receiving the pedal axle 12. The aperture 26 has an axis coextensive with the rotational axis of the pedal axle 12.

The bicycle pedal body 14 further includes a foot strap means 25 to retain a rider's foot on the bicycle pedal in a centered relationship therewith. The foot strap means 25 is adjustable in length to accommodate any rider's foot. In addition, the foot strap means 25 allows the rider to exert an upward force while the upper side 16 of the pedal body 14 allows the rider to exert a downward force and thus, the rider is able to exert a force with his foot throughout each rotational cycle of the bicycle pedal.

The bicycle pedal body 14 also includes a protective strap means 17 which partially defines the outboard end 24 of the bicycle pedal body 14 and is positioned and designed such as to prevent abrasion of the plastic pedal body member 15 when the pedal is mounted on the crank 11 of a bicycle for operation thereon. Thus, when the pedal 10 comes in contact with the ground and is scraped therealong, the protective strap 17 will prevent abrasion of the plastic pedal body member 15.

The pedal body 14 also includes inboard and outboard bearings 21, 23, respectively, mounted in the pedal body member 15. The bearings 21, 23, respectively define a portion of the aperture 26 and are nonrotatably mounted with respect to the pedal body member 15, but are rotatably mounted with respect to the pedal axle 12. Thus, the pedal body 14 may rotate with respect to the pedal axle 12.

The pedal body member 15 is preferably formed from a plasticlike material. Representatively, such a pedal body member 15 defines a majority of the upper side 16 which engages the rider's foot on the upper surface 28 of the pedal body 14. It is essential to have a configuration on the surface 28 which will increase the friction therebetween while providing a comfortable surface for the rider's foot, such a surface does not require the rider to wear shoes and will permit him to utilize the pedal 10 of the immediate invention on a stationary exercising cycle, in the comfort of his home. The embodiment shown in FIGS. 1—5 shows the use of recessed "cups" extending from the upper surface 28 of the upper side 16 to increase the friction between the rider's foot and the pedal. The form of these cups provides a circular ridge 32 with a centrally located depression 34 which acts in a manner similar to a suction cup when the rider's foot is engaged thereon. The ridges 32 are recessed such that they will not dig into the rider's foot to present an uncomfortable pedal.

It should be understood that the particular configuration of the surfaces need not be confined to recessed "lunar cups" as hereinabove described, but may be of any geometric configuration which lends itself to retaining the rider's foot on the bicycle pedal body 14. It is also apparent that such a design enhances the marketability of such a pedal as opposed to conventional bicycle pedals currently being marketed.

The upper surface 28 of the pedal body 14 has a concave curvature in a direction which is coextensive with the axis of rotation of the pedal body 14 as shown in FIG. 2. This concave curvature assists the foot strap means 25 to maintain the rider's foot in a centered position on the pedal and eliminates the tendency to move either in an outboard or an inboard direction The upper surface 28 also has a concave curvature in a direction perpendicular to the axis of rotation of the pedal body 14 This particular concave curvature maintains the rider's foot in a centered position on the bicycle pedal body 14 and assists the foot strap means 25 to eliminate the tendency of the rider's foot to slide off of the bicycle pedal 10 when he exerts a force in a direction generally tangential to the upper side 16

The upper surface 16 may further be designed with inboard and outboard protrusions 33 and 35, respectively, thereon. These protrusions extend from the upper surface 28 of the pedal body member 15 and assist the foot strap 25 to center and position the rider's foot on the pedal body 14 The inboard protrusion 33 prohibits the rider's foot from moving inboard to an extent where the rider's foot would interfere with the crank 11 when operating the pedal 10 to propel a bicycle. The outboard protrusion or lip 35 provides an antiskid ridge to assist the foot strap 25 to prohibit the rider's foot from sliding off the pedal 10. Such restraint is necessary, since if the rider's foot slides off the pedal, the rider's ankle or leg may be injured The pedal body member 15 has an opening 38 therein which is centrally located and has an axis coextensive with the rotational axis of the pedal axle 12 as best seen in FIG. 3. The opening 38 has an inboard portion 40 and an outboard portion 42 adapted to receive the inboard bearing 21 and an outboard bearing 23 respectively. Each of the openings 40, 42 has a diameter complimentary to the outside diameter of their respective bearings 21, 23, which allows the bearings 21, 23 to be pressed thereinto such that they are nonrotatably mounted in the pedal body member 15.

The inboard bearing 21 has an aperture 44 therein which defines a portion of the aperture 26 for receiving the pedal axle 12. A portion of the aperture 26 is defined by a surface 46 which is complimentary in shape to a frustoconical portion 48 of the pedal axle 12. The bearing 21 is part of the pedal body 14 and rotates therewith about the axle 12. When a force is applied in a direction of the rotational axis of the pedal body 14 towards the inboard end 22, the surface 48 absorbs the shock therefrom and prohibits the pedal body 14 from moving along the rotational axis of the pedal axle 12. It should be noted that the angle of such a surface 48 is not so small that the pedal body 14 would become locked with respect to the pedal axle 12 when such an inboard force is created. The bearing 21 is formed from a plasticlike material which possesses inherently favorable bearing characteristics without requiring lubrication such that the pedal body 14 may spin freely with respect to the pedal axle 12 in a silent, efficient manner.

The outboard end 24 has the opening 42 therein which nonrotatably receives the outboard bearing 23 in a manner similar to that described in connection with the inboard bearing 21. The outboard bearing 23 has an aperture 50 therein defining a portion of the aperture 26 for receiving the pedal axle 12 in a rotational manner. When the inboard bearing 21 and axle 12 are properly positioned, the outboard bearing 23 is positioned in the opening 24 and press fitted therein. This assures alignment of the bearings 21, 23, such that the rotational axis of the pedal body 14 and the pedal axle 12 will be coextensive with each other and thus maximize the spin characteristics of such a pedal. It should be understood that the bearing 23 is formed from a plasticlike material which possesses inherently favorable bearing characteristics without requiring lubrication such that the pedal body 14 may spin freely with respect to the pedal axle 12 in a silent, efficient manner.

In order to retain the pedal body 14 on the pedal axle 12, a groove 52 is provided in the outboard end of the pedal axle 12. A fastener 54 is pressed over the outboard end of the pedal axle 12 until it engages the groove 52. The fastener 54 also engages the outboard end 56 of the outboard bearing 23 and the outboard surface 58 of the pedal body member 15. When a force is exerted in a direction toward the outboard end 24 of the pedal body 14, the fastener means 54 will prohibit movement of the pedal body 14 while allowing relative rotation between the pedal body 14 and the pedal axle 12.

In order to retain the foot strap means 25 on the pedal body member 14, an indentation 55 is provided in the lower side 18. The foot strap means 25 has an opening 57 adapted to allow the pedal axle 12 to extend therethrough such that the foot strap means 25 may be positioned adjacent to the inboard end 22. Slots 53 are also provided in the foot strap means 25 to receive a portion of the protective strap means 17 such that the foot strap means 25 is secured to the pedal body member 15. The foot strap means 25 extends around the lower side 18 in the indentations and around a portion of the outboard end of the pedal body 15. The protective strap means 17 retains the foot strap means 25 in a fixed position with respect to the pedal body member 15 such that foot strap means 25 becomes a part of the pedal body 14 as hereinafter described in connection with the protective strap means 17. The foot strap means 25 can be made of any material but preferably is manufactured from a plasticlike material due to the lower costs involved in manufacturing such an item and greater comfort for the rider due to the flexibility of the plastic material.

The foot strap means 25 also has a retaining means 61, as shown in FIG. 7, attached to one end of the foot strap means 25 through an aperture 63 therein. A central portion 65 of the retaining member 61 extends through an opening 63. Extending portions 67 are provided adjacent to the upper and lower sides of the foot strap 25 such that the retaining member 61 is attached to the one end of the foot strap means 25. Since the foot strap member 25 is made from an extensible plasticlike material, the size of the opening 63 may be increased by stretching the foot strap member 25 to insert the retaining means 61. The foot strap 25 will return to its original form such that retaining means 61 is secured to the foot strap 25. The other end of the foot strap means 25 has apertures 69 therein adapted to be received by the central portion 65 of the retaining means 61. The retaining means 61 includes another extending portion 71 to retain the other end of the foot strap 25 with respect to the one end of the foot strap 25. Since there are a plurality of apertures 69 provided in the other end of the foot strap 25, the size of the foot strap 25 may be varied to accommodate various riders' feet.

It should be understood that the retaining means 61 may be manufactured from a plasticlike material as well known by those skilled in the art. It should also be apparent that the retaining means 61 may include any number of retaining members as hereinabove described.

An opening 41 is provided in the pedal body member 15 adjacent to the lower side 18. A weighting member 59 is received in the opening 41 to position the pedal in one position when at rest. The weighting member 59 is preferably manufactured from a material having a high density with respect to the density of the plastic pedal body member 15, for example, a metallic material. Thus, the pedal will be positioned such that the upper surface 16 is situated to receive a rider's foot when the pedal 10 is at rest.

The foot strap 25 is positioned around the inboard and outboard ends 22, 24, respectively to retain the weighting member 59 in the space 41. This design allows the pedal 10 to be assembled with a minimum of difficulty while retaining the weighting member 59 without the need for separate retaining or securing devices. By covering the outboard end of the pedal body member 15, the protective strap 17 also prohibits dirt, water, and other contaminants from entering the bearing surfaces defined by the bearings 21, 23 and axle 12. Yet another advantage provided by so positioning the protective strap 17 around the outboard end of the pedal body member 15 is that the unsightly appearance of the end of the fastener 54, the foot strap means 25, and the outboard end of the axle 12 is concealed thereby. It should be understood that the metallic surface presented by the protective strap 17 enhances the marketability of such a pedal since the pedal appears to have more rigid and durable quality than a plastic pedal without a metallic surface.

The protective strap 17 defines the outboard end 24 such that when a rider goes around a corner and scrapes the pedal on the ground, the outboard end 24 of the bicycle pedal body member 15 will be protected thereby. If the protective strap 17 were not present, the plastic pedal body member 15 would receive some abrasion by the ground and quickly deteriorate until the pedal 10 was inoperative. One example of such deterioration would exist where the pedal body member wore away to a point where the fastener 54 was distorted or the pedal body 14 would not rotate about the pedal axle 12.

The protective strap 17 extends from the outboard end 24 and around a portion of the remaining outer sides 20. A section of the protective strap 17 is typically shown in FIG. 3. The indentations 36 in the pedal body member 15 extend from the outboard end 24 around the side portions 37, 39 of the outer sides 20 to form a recess for the protective strap 17. By providing the protective strap 17 around the side portions 37, 39 of the pedal body 14, as shown in FIG. 3, the appearance of the pedal is enhanced. To further alter the design of such a pedal 10, the depression 43 in the protective strap may have a luminescent paint applied thereto to provide for a luminescent surface on the outer sides 20 of such a pedal.

It should be understood that a recess 60 is provided in the pedal body member 15, as shown in FIG. 3. This recess 60 provides for maintaining the walls of the pedal body member 15 in a substantially uniform cross-sectional dimension. If the pedal body member 15 were formed by a process such as injection molding, such a design consideration is important since the cooling rate of the pedal body member 15 would be substantially uniform and thus, warpage of the part would not occur during cooling in the mold. An additional advantageous factor is that the cycle time of the injection mold machine would be decreased because the amount of material required to cool would be decreased. It should be understood that the cycle time is dependent on the thickest cross-sectional area of the part to be formed and as this maximum cross section increases, the cycle time of the injection mold machine increases. It is yet a further advantage of such a recess 60 that the amount of material required to form the pedal body 15 is substantially decreased thus decreasing the cost of the pedal.

The protective strap 17 extends around a portion of the inboard end 22, as shown in FIG. 4. The ends of the protective strap 17 have ears 62 thereon which are adapted to be received in the complimentary slots 53 of the foot strap means 25 and slots 64 in the pedal body member 15 as best shown in FIGS. 4, 5 and 6. The ears 62 have barbs 66 such that when the ears 62 are forcibly inserted through the slots 53 and into the slots 64, the protective strap 17 will be fixedly retained on the pedal body member 15. The barbs 66 prevent the ears 62 from being pulled out of the slot 64. The ears 62 retain the foot strap means 25 to the pedal body member 15 such that the foot strap means 25 may receive a rider's foot in a secure manner.

It should be understood that other fastening means can be used in conjunction with the protective strap 17 to achieve the purpose of protecting the pedal body from abrasion and enhancing the appearance of the pedal. It is apparent that other configurations of the protective strap 17 may be utilized to further protect the pedal body member 15.

A second representative embodiment is shown in FIGS. 8—12. Due to the similarity in design of the second embodiment with respect to the embodiment shown in FIG. 1, and for ease of description, common reference numerals will be used in connection with common parts with the suffix "a" appended thereto.

Figure 8:
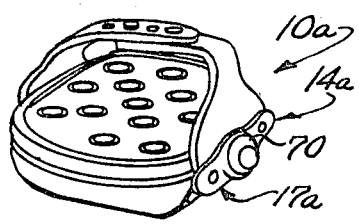
FIG. 8 is a perspective view of a bicycle pedal embodying the present invention, but of a modified construction.

The pedal 10a as shown in FIG. 8 and 9 includes a pedal axle 12a and a pedal body 14a. The pedal body 14a includes a pedal body member 15a, protective strap means generally indicated at 17a, foot strap means 25a, and inboard and outboard bearings 21a, 23a, respectively.

The protective strap means 17a includes an outboard member 70 and inboard member 72 with clamping means 74 disposed therebetween. The outboard member 70 consists of a stamped member having apertures 75 therein for receiving rods 76 of clamping means 74 therein. The rods 76 extend through the apertures 75, the openings 73 in foot strap means 25a, the opening in the pedal body member 15a and through complimentary apertures 78 in the inboard strap member 72. Heads are then formed on one end of the rods 76 to effect securement of the inboard and outboard end members 70, 72, respectively to said pedal body member 15a The pedal body member 15a has an opening 41a adjacent to the lower side 18a. A weighting member 59a is received therein and retained in the opening 41a by the strap means 25a. The strap means 25a prohibits movement of the weighting member 59a in the opening 41a.

Figure 12:
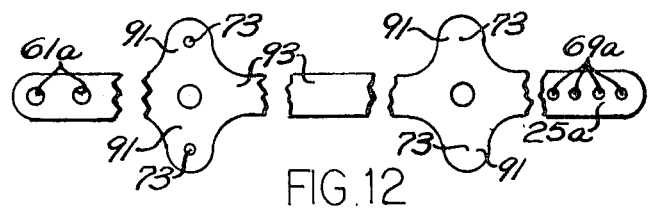
FIG. 12 is a plan view of a foot strap having retaining means prior to assembly.

The foot strap means 25a, as shown in FIG. 12, includes retaining means 61a on one end thereof and apertures 69a on the other end thereof, as described in connection with the pedal 10, shown in FIGS. 1—7. The strap 25a has outwardly extending portions 91 which are complimentary in configuration to the inboard and outboard members 70, 72, respectively. A central portion 93 of the foot strap 25a is positioned in an indentation 55a of the pedal body member 15a. The outwardly extending portions 91 are positioned adjacent to the inboard member 70 and outboard member 72 such that the rods 76 extend through the apertures 73 of the extending portions 91. When the heads are formed on one end of the rods 76, the foot strap means 25a is secured to the pedal body member 15a and thus becomes part of the pedal body 14a. It should be understood that the foot strap means 25a operates in a manner similar to that described in connection with the foot strap means 25, shown in FIGS. 1—7.

Figure 11:
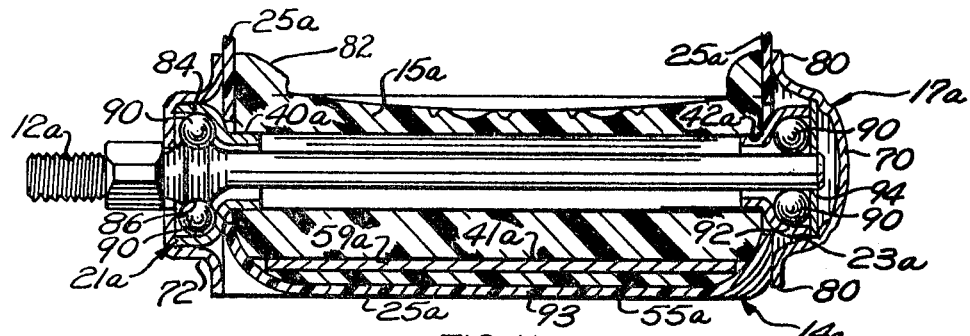
FIG. 11 is a cross-sectional view of the pedal of the modified construction as shown in FIG. 9 and taken along line 11–11 thereof.

The outboard protective strap member 70 has an outboard protrusion 80 as shown in FIG. 11 to assist the foot strap means 25 to prohibit the rider's foot from sliding off the pedal when operating such a pedal 10a. The inboard member 72 has an inboard protrusion 82 to assist the foot strap means 25 to prohibit the rider's foot from moving inboard to an extent where the rider's foot would interfere with the bicycle crank when operating the pedal 10a to propel a bicycle.

Figure 10:
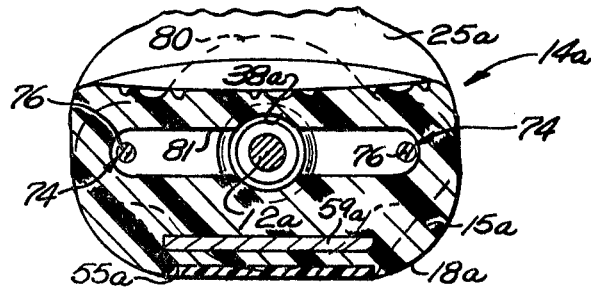
FIG. 10 is a cross-sectional view of the bicycle pedal shown in FIG. 9 taken along lines 10–10 thereof.

The pedal body member 15a has an opening 81, a portion of which defines the aperture 38a. The aperture 38a, as seen in FIG. 10, is centrally located and has an axis coextensive with the rotational axis of the pedal axle 12a. An inboard opening 40a and an outboard opening 42a are provided to receive the inboard bearing 21a and outboard bearing 23a, respectively as seen in FIG. 11.

The inboard bearing 21a has an inboard bearing member 84 which is nonrotatably received by the opening 40a in the pedal body member 15a. The axle 12a has a groove 86 which is adapted to rotatably receive the ball bearings 90 of the inboard bearing 21a. Thus, when the pedal is assembled, as shown in FIGS. 9 and 11, the groove 86 prohibits the pedal body from moving in a direction along the axis of rotation of the pedal body 15a since the ball bearings 90 are in communication with the inboard bearing member 84 and inboard protective strap member 72. Thus, means are provided on the pedal 10a to prohibit movement of the pedal body along the rotational axis of the pedal axle 12a while allowing relative rotation between the pedal axle 10and the pedal body 14a.

In a like manner, the outboard bearing 23a includes an outboard bearing member 92, ball bearings 90 and a washer 94. The washer 94 is maintained in compression against the member 92 with the ball bearings 90 interposed therebetween. The ball bearings 90 are positioned such that the outboard end of the axle 12a bears against the bearing 90 and consequently the bearings 90 contact the bearing member 92 and washer 94 such that the outboard end of the axle 12a is supported in a rotatable manner.

It should be apparent from the above that applicant has provided a highly improved bicycle pedal which includes a pedal axle and a pedal body wherein a portion of the pedal body is formed from a plasticlike material. The pedal of the immediate invention is designed to include a foot strap means to retain the rider's foot on the bicycle pedal and in a centered position. The pedal of the immediate invention is further designed to resist abrasion, have excellent spin characteristics while being silent in operation with favorable strength and impact resistance characteristics. The pedal body of the present invention includes a protective strap formed from a metallic material to protect the plastic pedal body member of the pedal body from abrasion.

Having described my invention,

1. A bicycle pedal comprising a pedal axle and a pedal body, said pedal body including a tread member having an upper side adapted to be engaged by a rider's foot and outer sides adjacent to said upper side and a lower side adjacent to said outer sides, said tread member having inboard and outboard ends, said tread member being made of a plasticlike material, said tread member having an aperture therein extending through a continuous portion thereof from said inboard end to said outboard end and rotatably receiving said pedal axle, said aperture having an axis coextensive with the rotational axis of said pedal axle, said pedal body further including foot strap means for retaining the rider's foot on said upper side, said pedal axle including means thereon operable to prohibit movement of the pedal body along the rotational axis of said pedal axle while allowing relative rotation between said pedal body and said pedal axle, and weight means carried within the pedal body for positioning said pedal body in a foot-receiving position when at rest.

2. A bicycle pedal as defined in claim 1 wherein said weight means including a weighting member retained in said pedal body by said foot strap means.

3. A bicycle pedal as defined in claim 2 wherein said weighting member is located in a space in said plastic tread member adjacent to said lower side of said pedal body and retained therein by said foot strap means.

4. A bicycle pedal as defined in claim 1 wherein said foot strap means includes a strap member for retaining the rider's foot on the pedal which is adjustable in length to accommodate feet of various sizes.

5. A bicycle pedal as defined in claim 1 wherein said pedal body includes protective strap means which covers a portion of said plastic tread member for protecting said plastic tread member.

6. A bicycle pedal as defined in claim 5 wherein said foot strap means is attached to said tread member by said protective strap means.

7. A bicycle pedal as defined in claim 6 wherein said protective strap means includes clamping means extending from said inboard end to said outboard end, said clamping means attached to said tread member to effect securement of said protective strap means defining at least a portion of said outer sides of said outboard end.

8. A bicycle pedal as defined in claim 1 wherein said pedal body includes bearing means, defining a portion of said aperture of said tread member, said bearing means retaining said pedal body to said pedal axle.

9. A bicycle pedal as defined in claim 1 wherein said pedal body includes bearing means having at least one bearing member formed from a plasticlike material, said plastic tread member having an opening therein nonrotatably receiving said one plastic bearing member, said one plastic bearing member having an aperture therein for receiving said pedal axle and received in a portion of said aperture of said pedal body.

10. A bicycle pedal as defined in claim 1 wherein said pedal body includes bearing means having at least one bearing member formed from a metallic material and a plurality of ball bearings, said plastic tread member having an opening therein receiving said one bearing member said one bearing member operably receiving said ball bearings therein which receive said pedal axle.

11. A bicycle pedal as defined in claim 10 wherein said means on said pedal axle to prohibit movement of the pedal body along the rotational axis of said pedal axle includes a groove formed in a portion of said pedal axle and operably rotatably engages ball bearings.

12. A bicycle pedal as defined in claim 1 wherein said pedal body includes a concave curvature in a direction perpendicular to the axis of rotation of said pedal body providing a surface for engaging and maintaining the rider's foot centered thereon.

13. A bicycle pedal as defined in claim 1 wherein recessed friction cups are provided on a portion of said upper side for minimizing relative movement between the rider's foot and said bicycle pedal.